Jan. 26, 1965 S. L. BROADHEAD, JR 3,167,721

TRANSISTORIZED NOISE PULSE BLANKING NETWORK INCLUDING FEEDBACK MEANS

Filed Feb. 18, 1963

INVENTOR

SAMUEL L. BROADHEAD JR.

BY Moody and Harris

ATTORNEYS 3,167,721
Patented Jan. 26, 1965

3,167,721

TRANSISTORIZED NOISE PULSE BLANKING NETWORK INCLUDING FEEDBACK MEANS

Samuel L. Broadhead, Jr., Cedar Rapids, Iowa, assignor to Collins Radio Company, Cedar Rapids, Iowa, a corporation of Iowa Filed Feb. 18, 1963, Ser. No. 259,063
6 Claims. (Cl. 330—19)

This invention relates to a noise pulse blanking network and more particularly to a network which may be used to eliminate noise pulses superposed on an audio signal, and constitutes a continuation-in-part of copending United States application, Serial No. 63,058, filed October 17, 1960, by Samuel L. Broadhead, Jr., now abandoned.

One of the more perplexing problems of the electronic industry is the elimination of noise or other spurious pulses which may be superposed on a signal. As well known in the art, unless these noise pulses are eliminated serious deterioration of intelligibility may result. In attempting to solve this problem a great variety of noise limiting circuits have heretofore been proposed and utilized. Of these, many utilized means for inverting the noise pulses and combining the inverted noise pulses with the original signal having the noise pulses superposed thereon. All of the heretofore proposed or utilized devices, however, have been only partially successful in completely eliminating noise pulses superposed on a signal, and this has been at least partially due to the heretofore unsolved problem of providing adequate control over the amplitudes of the noise pulses.

In the past, noise pulse eliminating circuits have also commonly been utilized to remove noise pulses from an incoming amplitude modulated signal prior to the coupling of the amplitude modulated signal to the detector stage of a receiver. However, in many circuits, for example, in circuits wherein I.-F. filters are utilized that have high attenuation slopes at the edges of the pass band, noise blanking in either the R.-F. or the I.-F. stage has proven to be unsatisfactory.

It is therefore an object of this invention to provide a noise pulse blanking network which is superior to those now known or utilized.

More particularly, it is an object of this invention to provide a simple, yet effective, noise limiting network that is capable of substantially eliminating all noise pulses superposed on an audio signal.

Still more particularly, it is an object of this invention to provide an improved noise blanking network that has means to clip the noise pulses superposed on the received audio signal and then coupling the signal to a signal combining means, means for inverting only the clipped noise pulses and coupling inverted noise pulses to said signal combining means, and feedback means responsive to the received audio signal for controlling the amplitude of the inverted noise pulses coupled to said signal combining means so as to cause substantially complete cancellation of the noise pulses in said signal combining means.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawing illustrates one complete example of the embodiment of the invention constructed according to the best mode so far devised for the practical application of the principles thereof, and in which.

Figures 2, 3:
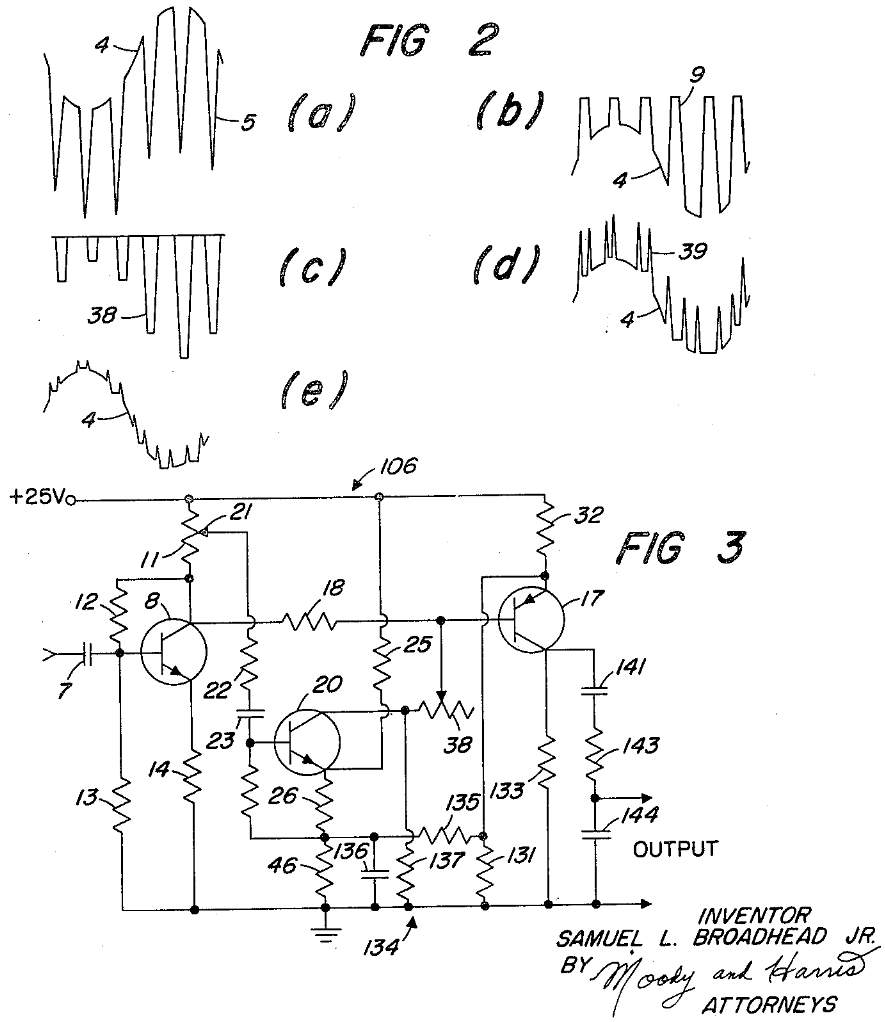
FIGURE 2 is a series of representative waveforms which may be present at selected stages of the network shown in FIGURE 1.
FIGURE 3 is a schematic presentation of a second embodiment of the noise blanking circuit of this invention.

Referring now to the drawings in which like numerals have been used for like characters throughout, an audio signal 4 having noise pulses 5 superposed thereon, such as, for example, negative noise pulses as shown in FIGURE 2(*a*), may be received by the network 6 of this invention from suitable means (not shown), such as, for example, from the detector of a conventional receiver. It is to be appreciated, of course, that if the received noise pulses are of a positive polarity, the received pulses could be inverted in a manner well known in the art and thereafter be comparable to the representative noise pulses as shown in FIGURE 2(*a*).

Figure 1:
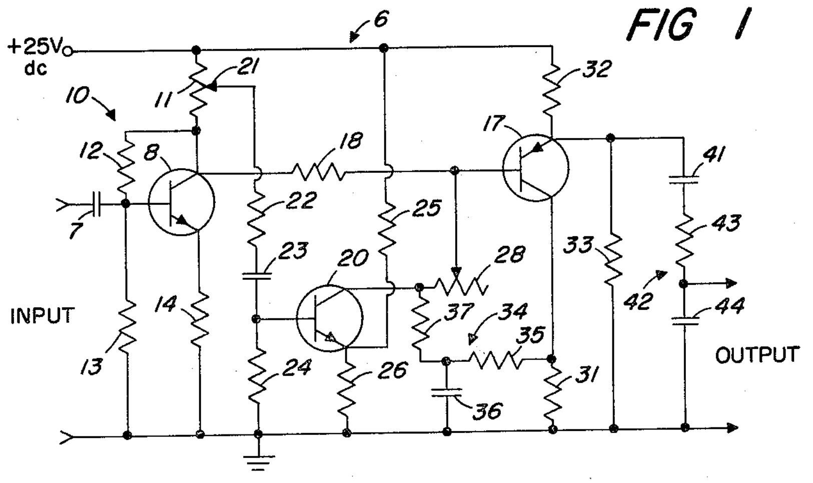
FIGURE 1 is a schematic presentation of the noise blanking circuit of this invention.

As shown in the preferred embodiment of FIGURE 1, the received audio signal is coupled through capacitor 7 to the base of transistor 8, which transistor may be of the NPN type and is preferably biased to clip all noise pulses at a predetermined level above the peaks of the audio signal, such as, for example, as shown by the clipped pulses 9 in FIGURE 2(*b*).

To provide operating voltages for transistor 8, a voltage divider 10 comprising serially connected resistors 11, 12 and 13 is connected between a positive direct voltage source, preferably 25 volts, and ground. The collector of transistor 8 is connected to the junction between resistors 11 and 12 while the base of transistor 8 is connected between the junction of resistors 12 and 13. In addition, the emitter of transistor 8 is connected to ground through a resistor 14.

The audio signal with the clipped noise pulses superposed thereon is coupled to the base of a PNP type transistor 17 through resistor 18. Transistor 17, which serves as a signal combining means, also receives the output from NPN type transistor 20, as more fully brought out hereinafter.

The output from the collector of transistor 8 is also applied to the base of transistor 20 and, as shown in FIGURE 1, may be coupled to transistor 20 through a portion of resistor 11, variable tap 21, resistor 22 and capacitor 23. In addition, the base of transistor 20 is connected to ground through resistor 24. Transistor 20 is normally biased below cutoff and has its emitter connected to the 25 volt direct voltage supply through resistor 25 and is returned to ground through resistor 26. Thus, transistor 20 conducts only when a noise pulse of positive polarity is applied to the base sufficient to overcome the bias on the transistor.

Due to the 180° phase shift in transistor 20, the spurious or noise pulses are inverted and the inverted, or negative, polarity pulses are coupled to the base of transistor 17 through variable resistor 28.

Transistor 17 is connected as an emitter follower having its collector connected to ground through resistor 31 and its emitter connected to the junction between serially connected resistors 32 and 33, which resistors are connected between the 25 volt direct current power supply and ground.

It is an important feature of this invention that the audio output signal from transistor 17 is fed back to transistor 20 to control the amplitude of the inverted noise pulses. As shown in FIGURE 1, the collector of transistor 17 is connected to the collector of transistor 20 through low-pass filter 34, consisting of resistor 35 and capacitor 36. Resistor 35 is connected at one side to the collector of transistor 17 and at the other side to the collector of transistor 20 through resistor 37, while capacitor 36 is connected between ground and the junction of resistors 35 and 37. Thus, the audio signal is fed back from the collector of transistor 20 through low-pass filter 34 and resistor 37 to the collector of transistor 20.

By proper selection of components, the conduction of transistor 20 may thus be controlled so that the amplitude of the inverted noise pulses 38 [as shown by FIGURE 2(*c*)] from transistor 20, applied to the base of transistor 17, will vary inversely with the varying amplitude of the audio signal, as shown by comparing FIGURES 2(*b*) and 2(*c*). In other words, the amplitude of each inverted noise pulse will be controlled by the audio signal so that its amplitude will be substantially equal to the amplitude of that portion of the clipped noise pulse 9 [as shown in FIGURE 2(*b*)] superposed on the audio signal, that is, the portion which exceeds the audio signal itself, so that when combined the two signals will oppose and cancel, as shown by FIGURE 2(*d*). The cancellation may, however, not be perfect and spikes 39 may remain, as also shown in FIGURE 2(*d*).

The signal may then be coupled through capacitor 41 to a filter 42 consisting of a resistor 43, connected between capacitor 41 and the output, and capacitor 44, connected between the output and ground, to thereby remove ripple from the output audio signal, so that the output is substantially noise free as shown in FIGURE 2(*e*).

In operation (FIGURE 1 embodiment), an input audio signal having no noise pulses superposed thereon will be amplified by transistor 8 coupled to emitter follower 17 through the signal path having resistor 18 therein, and then be coupled from the output of the network, which output is connected with the emitter of transistor 17. The second signal path to the base of transistor 17, that is, from the collector of transistor 20 through resistor 28, will not be operative since in the absence of a noise pulse, transistor 20 will not conduct.

When an audio signal with noise or other spurious pulses superposed thereon, as shown by FIGURE 2(*a*), is received at the input of network 6, the pulses will be clipped at a predetermined level by transistor 8 and the audio signal with the clipped pulses, as shown by FIGURE 2(*b*), will be applied to the base of transistor 17. However, transistor 20 will now conduct since the positive noise pulses will be applied to the base of transistor 20. The output from the collector of transistor 20 which, due to the 180° phase shift between the base and collector in the transistor, will be negative noise pulses and these pulses, when coupled to the base of transistor 17, will be inverted with respect to the noise pulses superposed on the audio signal and coupled therewith to transistor 17.

The magnitude of the pulses applied to the base of transistor 17 through transistor 20 will be controlled by the feedback from the collector of transistor 17 through low-pass filter 34. This feedback will vary the collector voltage of transistor 20 and will cause the amplitude of the inverted noise pulses to vary inversely to the amplitude of the audio signal, as brought out hereinabove, and as shown by a comparison of FIGURES 2(*b*) and 2(*c*). Since the noise pulses applied to the base of transistor 17 from the two signal paths are of opposite polarity and of substantially equal magnitude, they cancel so that the output from network 6 is substantially free of noise. To remove any ripple which might be present, the audio signal is preferably filtered prior to coupling from the network of this invention.

A typical set of component values which have been used in a working embodiment of this invention according to FIGURE 1 follows. It is to be understood, of course, that these specific component values are merely illustrative and that the specific components might be changed, as evident to one skilled in the art, without departure from the scope of this invention.

| Component | Identification Number | Size or type |
|---|---|---|
| Capacitor | 7 | 10 µf. |
| Transistor (NPN type) | 8 | 2N335. |
| Resistor | 11 | 10K ohms (maximum). |
| Do | 12 | 12K ohms. |
| Do | 13 | 2.2K ohms. |
| Do | 14 | 330 ohms. |
| Transistor (PNP type) | 17 | 2N329. |
| Resistor | 18 | 12K ohms. |
| Transistor (NPN type) | 20 | 2N335. |
| Resistor | 22 | 1.2K ohms. |
| Capacitor | 23 | .5 µf. |
| Resistor | 24 | 22K. |
| Do | 25 | 5K ohms. |
| Do | 26 | 120 ohms. |
| Do | 28 | 0—50K ohms. |
| Do | 31 | 2.5K ohms. |
| Do | 32 | 1.2K ohms. |
| Do | 33 | 1.2K ohms. |
| Do | 35 | 5.6K ohms. |
| Capacitor | 36 | .01 µf. |
| Resistor | 37 | 5.6K ohms. |
| Capacitor | 41 | 10 µf. |
| Resistor | 43 | 2.2K ohms. |
| Capacitor | 44 | .01 µf. |

FIGURE 3 illustrates a second embodiment 106 of this invention wherein the audio feedback is taken from the emitter of transistor 17 and coupled back to the emitter of transistor 20. The operation of the circuit is essentially the same as described hereinabove with respect to FIGURE 1 except the waveforms as shown in FIGURES 2(*d*) and 2(*e*) would be inverted since the output is taken from the collector of transistor 17 through capacitor 141 and resistor 143 (the components may be identical to the corresponding components connected to the emitter of transistor 17, as shown in FIGURE 1, as also may resistors 131 and 133 and capacitor 144 be identical in the same manner).

As shown in FIGURE 3, the audio output is coupled though filter 134 (which may be identical to filter 34) and resistor 26 to the emitter of transistor 20. To provide for application of the feedback to the emitter, a second resistor 46 has been added in series with resistor 26, and resistor 137 (connected at one end to the collector of transistor 207) has been connected to ground.

From the foregoing, it should be evident to those skilled in the art that this invention provides a simple, yet effective, noise pulse blanking network that may be utilized to effectively cancel all noise pulses superposed on an audio signal.

What is claimed as my invention is:

1. A network for eliminating spurious pulses superposed on a received audio signal, said network comprising: clipping means for receiving an audio signal with spurious pulses superposed thereon and limiting the amplitudes of said spurious pulses; signal combining means from which an output audio signal may be taken; means providing a first signal path to said signal combining means for coupling the output from said clipping means thereto; signal inverting means connected to the output of said clipping means for receiving said spurious pulses and inverting the same; means providing a second signal path to said signal combining means for coupling the output from said inverting means thereto; and feedback means connected to said signal combining means and said inverting means for controlling the amplitude of each of the inverted spurious pulses coupled to said signal combining means through said second signal path whereby each of said inverted pulses is caused to have an amplitude substantially equal to that portion of the same spurious pulse coupled through said first path which exceeds said audio signal so that said spurious pulses are effectively cancelled in said signal combining means.

2. The network of claim 1 wherein said signal inverting means comprises a transistor having its base connected to said clipping means and its collector connected to said signal combining means, said transistor being normally biased below cutoff to pass only a predetermined portion of each of said spurious pulses.

3. The network of claim 1 wherein said feedback means includes a low-pass filter to assure that the magnitude of the output from said inverting means will be controlled by the audio signal coupled to said signal combining means.

4. A network for eliminating noise pulses superposed on a received audio signal, said network comprising: means for clipping said spurious pulses at a predetermined level; signal combining means; means for coupling the output signal from said clipping means to said signal combining means; an amplifier connected to said clipping means, said amplifier being biased to pass only noise pulses and inverting the same; means for coupling the output from said amplifier to said signal combining means; and feedback means including a low-pass filter connected between said signal combining means and said amplifier for controlling the amplitude of the output pulses from said amplifier so that said inverted noise pulses coupled to said signal combining means substantially cancel all noise pulses superposed on the audio signal.

5. A network for eliminating noise pulses superposed on a received audio signal, said network comprising: a first transistor for clipping all noise pulses at a predetermined level; a second transistor connected as an emitter follower with its base connected to the collector of said first transistor for receiving the output therefrom and its emitter adapted to have the output from said network taken therefrom; a third transistor biased below cutoff and having its base connected to the collector of said first transistor for receiving the output from said first transistor and conducting only when noise pulses are applied to said base, the collector of said third transistor being connected to the base of said second transistor for coupling inverted noise pulses to said second transistor; and a low-pass filter connected between the collector of said second transistor and the collector of said third transistor whereby the output from said third transistor is controlled by said second transistor so that inverted noise pulses applied to said second transistor are caused to vary in amplitude inversely with the amplitude of said audio signal coupled to said second transistor to thereby substantially cancel and eliminate all noise pulses present in said received audio signal.

6. A network for eliminating noise pulses superposed on a received audio signal, said network comprising: a first transistor for clipping all noise pulses at a predetermined level; a second transistor having its base connected to the collector of said first transistor for receiving the output therefrom and its collector adapted to have the output from said network taken therefrom; a third transistor biased below cutoff and having its base connected to the collector of said first transistor for receiving the output from said first transistor and conducting only when noise pulses are applied to said base, the collector of said third transistor being connected to the base of said second transistor for coupling inverted noise pulses to said second transistor; and a low-pass filter connected between the emitter of said second transistor and the emitter of said third transistor whereby the output from said third transistor is controlled by said second transistor so that inverted noise pulses applied to said second transistor are caused to vary in amplitude inversely with the amplitude of said audio signal coupled to said second transistor to thereby substantially cancel and eliminate all noise pulses present in said received audio signal.

References Cited in the file of this patent

UNITED STATES PATENTS

| | | |
|---|---|---|
| 2,305,893 | Oman | Dec. 22, 1942 |
| 2,970,276 | Dollinger | Jan. 31, 1961 |
| 2,987,701 | Grammemann | June 6, 1961 |